(12) United States Patent
Ono

(10) Patent No.: US 9,250,677 B2
(45) Date of Patent: Feb. 2, 2016

(54) INFORMATION PROCESSING APPARATUS, INFORMATION PROCESSING SYSTEM, AND COMPUTER-READABLE RECORDING MEDIUM

(71) Applicant: Takayuki Ono, Kanagawa (JP)

(72) Inventor: Takayuki Ono, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 373 days.

(21) Appl. No.: 13/771,487

(22) Filed: Feb. 20, 2013

(65) Prior Publication Data

US 2013/0232354 A1 Sep. 5, 2013

(30) Foreign Application Priority Data

Mar. 5, 2012 (JP) ................................. 2012-047792

(51) Int. Cl.
*G06F 1/32* (2006.01)

(52) U.S. Cl.
CPC ................ *G06F 1/32* (2013.01); *G06F 1/3206* (2013.01); *G06F 1/3284* (2013.01); *Y02B 60/1267* (2013.01)

(58) Field of Classification Search
CPC ............................ G06F 3/1229; G06F 1/3284
See application file for complete search history.

(56) References Cited

U.S. PATENT DOCUMENTS

| | | | | |
|---|---|---|---|---|
| 8,610,915 B2 * | 12/2013 | Nishikawa | ................... | 358/1.14 |
| 2009/0077399 A1 * | 3/2009 | Noda et al. | ................... | 713/320 |
| 2010/0070216 A1 | 3/2010 | Murata | | |
| 2012/0053868 A1 * | 3/2012 | Matsumoto | .................... | 702/61 |

FOREIGN PATENT DOCUMENTS

JP   2010-072253   4/2010

* cited by examiner

*Primary Examiner* — Jaweed A Abbaszadeh
*Assistant Examiner* — Alyaa T Mazyad
(74) *Attorney, Agent, or Firm* — IPUSA, PLLC

(57) ABSTRACT

An information processing apparatus may include an acquiring unit to periodically acquire, from an apparatus, information indicating an amount of power consumption stored for each of power supply states of the apparatus, a computation unit to compute a ratio of the amount of power consumption for each of the power supply states included in the information, for each information acquired by the acquiring unit, and an output unit to output information indicating a change in the ratio, based on an order of the information acquired.

15 Claims, 19 Drawing Sheets

FIG.7

| DATE | APPARATUS NAME | AMOUNT OF POWER CONSUMPTION (Wh) | | | |
|---|---|---|---|---|---|
| | | WORKING STATE | STANDBY STATE | POWER SAVING STATE | POWER OFF STATE |
| ⋮ | A | ⋮ | ⋮ | ⋮ | ⋮ |
| | B | ⋮ | ⋮ | ⋮ | ⋮ |
| | C | ⋮ | ⋮ | ⋮ | ⋮ |
| ⋮ | A | ⋮ | ⋮ | ⋮ | ⋮ |
| | B | ⋮ | ⋮ | ⋮ | ⋮ |
| | C | ⋮ | ⋮ | ⋮ | ⋮ |
| ⋮ | A | ⋮ | ⋮ | ⋮ | ⋮ |
| | B | ⋮ | ⋮ | ⋮ | ⋮ |
| | C | ⋮ | ⋮ | ⋮ | ⋮ |
| ⋰ | ⋰ | ⋰ | ⋰ | ⋰ | ⋰ |

FIG.8

| APPARATUS NAME | AMOUNT OF POWER CONSUMPTION | | | |
|---|---|---|---|---|
| | WORKING STATE | STANDBY STATE | POWER SAVING STATE | POWER OFF STATE | TOTAL |
| A | 3000 | 2000 | 1000 | 0 | 6000 |
| B | 1500 | 1000 | 500 | 0 | 3000 |
| C | 4000 | 4000 | 500 | 500 | 9000 |

FIG.9

| APPARATUS NAME | RATIO (%) OF AMOUNT OF POWER CONSUMPTION | | | |
|---|---|---|---|---|
| | WORKING STATE | STANDBY STATE | POWER SAVING STATE | POWER OFF STATE | TOTAL |
| A | 50 | 33.3 | 16.7 | 0 | 100 |
| B | 50 | 33.3 | 16.7 | 0 | 100 |
| C | 44.4 | 44.4 | 5.6 | 5.6 | 100 |

FIG.13A

| APPARATUS NAME | RATIO (%) OF AMOUNT OF POWER CONSUMPTION | | | |
|---|---|---|---|---|
| | WORKING STATE | STANDBY STATE | POWER SAVING STATE | POWER OFF STATE | TOTAL |
| A | 50 | 33.3 | 16.7 | 0 | 100 |
| B | 50 | 33.3 | 16.7 | 0 | 100 |
| C | 44.4 | 44.4 | 5.6 | 5.6 | 100 |

FIG.13B

| APPARATUS NAME | RATIO (%) OF AMOUNT OF POWER CONSUMPTION | | | |
|---|---|---|---|---|
| | WORKING STATE | STANDBY STATE | POWER SAVING STATE | POWER OFF STATE | TOTAL |
| A | 40 | 20 | 20 | 20 | 100 |
| B | 60 | 20 | 10 | 10 | 100 |
| C | 20 | 60 | 10 | 10 | 100 |

FIG.13C

| APPARATUS NAME | RATIO (%) TO PREVIOUS POWER CONSUMPTION | | | |
|---|---|---|---|---|
| | WORKING STATE | STANDBY STATE | POWER SAVING STATE | POWER OFF STATE |
| A | 80 | 60 | 119 | 0 |
| B | 120 | 60 | 59.9 | 0 |
| C | 45 | 60 | 59.9 | 179 |

FIG.19

| APPARATUS NAME | RECOMMENDED TIMING |
|---|---|
| A | 16:00 |
| B | 17:00 |
| C | 11:00 & 17:00 |

RECOMMENDED TIMING NOTIFYING SCREEN — 520

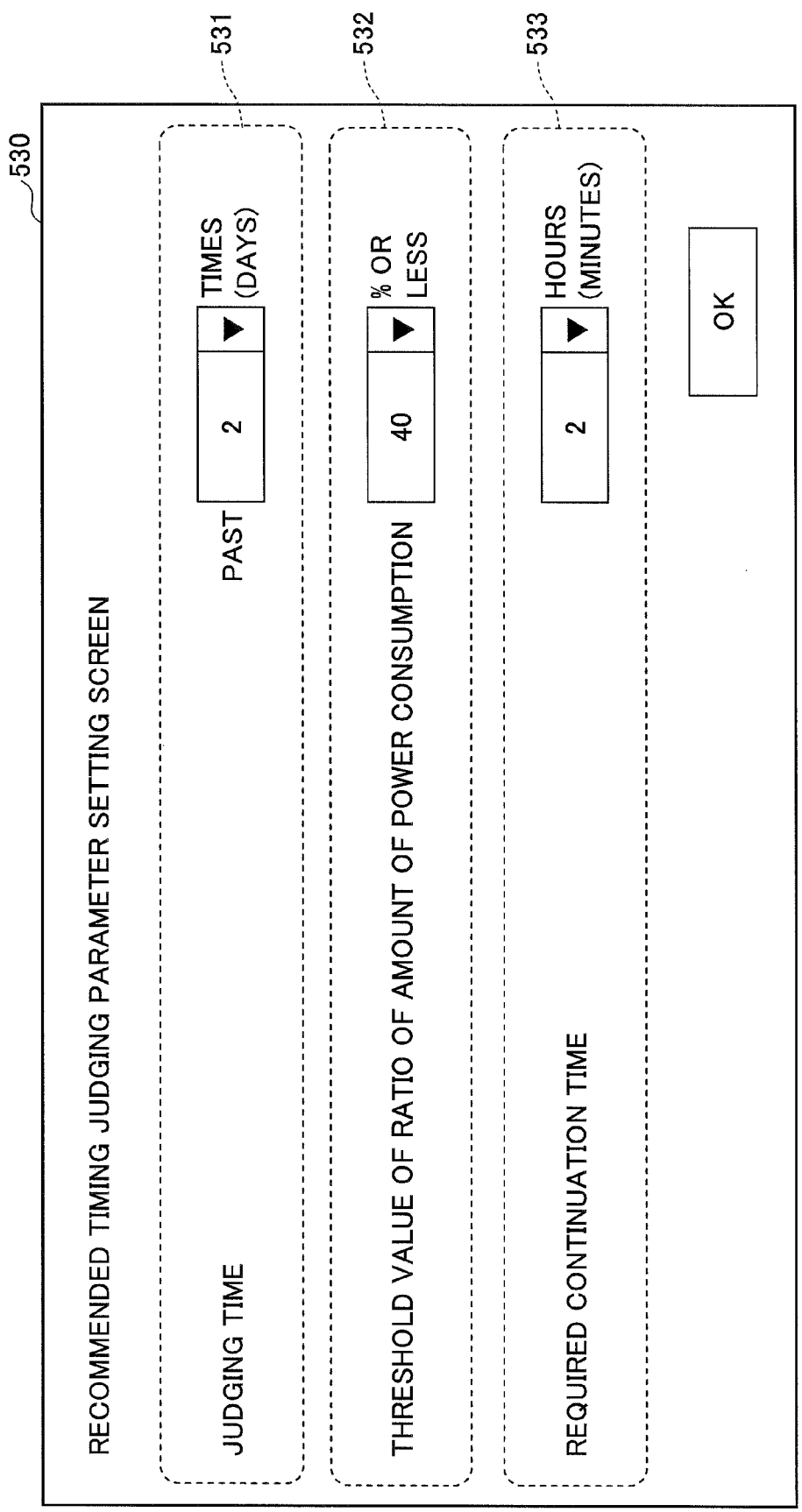

INFORMATION PROCESSING APPARATUS, INFORMATION PROCESSING SYSTEM, AND COMPUTER-READABLE RECORDING MEDIUM

CROSS-REFERENCE TO RELATED APPLICATIONS

This application is based upon and claims the benefit of priority of Japanese Patent Application No. 2012-047792 filed on Mar. 5, 2012, the entire contents of which are incorporated herein by reference.

BACKGROUND OF THE INVENTION

1. Field of the Invention

The present invention relates to an information processing apparatus, an information processing system, and a computer-readable recording medium.

2. Description of the Related Art

Due to the recent demands on environmentally friendly and energy saving (or the so-called "green") systems, there are also demands for a green image forming apparatus (hereinafter also referred to as "apparatus"), such as a printer, a copying machine, and a MFP (Multi Function Peripheral). For example, apparatus models having low power consumption may be preferred on the market. Information related to the power consumptions of apparatuses manufactured by major manufacturers is published by designated organizations, and may be used as one of the important criterions used by a user when purchasing the apparatus. In addition, even after purchasing the apparatus, the user (or corporation) may be interested in knowing the amount of power consumption of the apparatus in the office.

Conventionally, a technique has been proposed to comprehend the amount of power consumption of the apparatus. For example, according to the technique proposed in Japanese Laid-Open Patent Publication No. 2010-72253, the user may predict the amount of power consumption that may be saved by using a certain apparatus model.

However, the apparatus set up in the office may be expensive, and it may be difficult to simply replace the apparatus with another apparatus. The user who uses the apparatus based on a lease contract may replace the apparatus more easily, however, replacing the apparatus during the lease contract may consequently increase management costs.

SUMMARY OF THE INVENTION

Accordingly, embodiments of the present invention may provide a novel and useful information processing apparatus, information processing system, and computer-readable recording medium, in which the problem described above may be suppressed.

More particularly, embodiments of the present invention may provide an information processing apparatus, an information processing system, and a computer-readable recording medium that may provide a form of use that may increase the possibility of reducing the amount of power consumption.

According to one aspect of the present invention, an information processing apparatus may include an acquiring unit configured to periodically acquire, from an apparatus, first information indicating an amount of power consumption stored for each of a plurality of power supply states of the apparatus; a computation unit configured to compute a ratio of the amount of power consumption for each of the plurality of power supply states included in the first information, for each first information acquired by the acquiring unit; and an output unit configured to output second information indicating a change in the ratio, based on an order of the first information acquired.

Other objects and further features of the present invention will be apparent from the following detailed description when read in conjunction with the accompanying drawings.

BRIEF DESCRIPTION OF THE DRAWINGS

FIG. 7 is a diagram illustrating an example of a structure of a log storage unit;

FIG. 8 is a diagram illustrating an example of computed results for the amount of power consumption in one analyzing time period;

FIG. 9 is a diagram illustrating an example of computed results for a ratio of the amount of power consumption in one analyzing time period;

FIGS. 13A, 13B, and 13C are diagram for explaining an example of computed results in relation to previous computed results;

FIG. 19 is a diagram illustrating an example of a display of a recommended timing notifying screen; and FIG. 20 is a diagram illustrating an example of a display of a recommended timing judging parameter setting screen.

DESCRIPTION OF THE PREFERRED EMBODIMENTS

Figure 1:
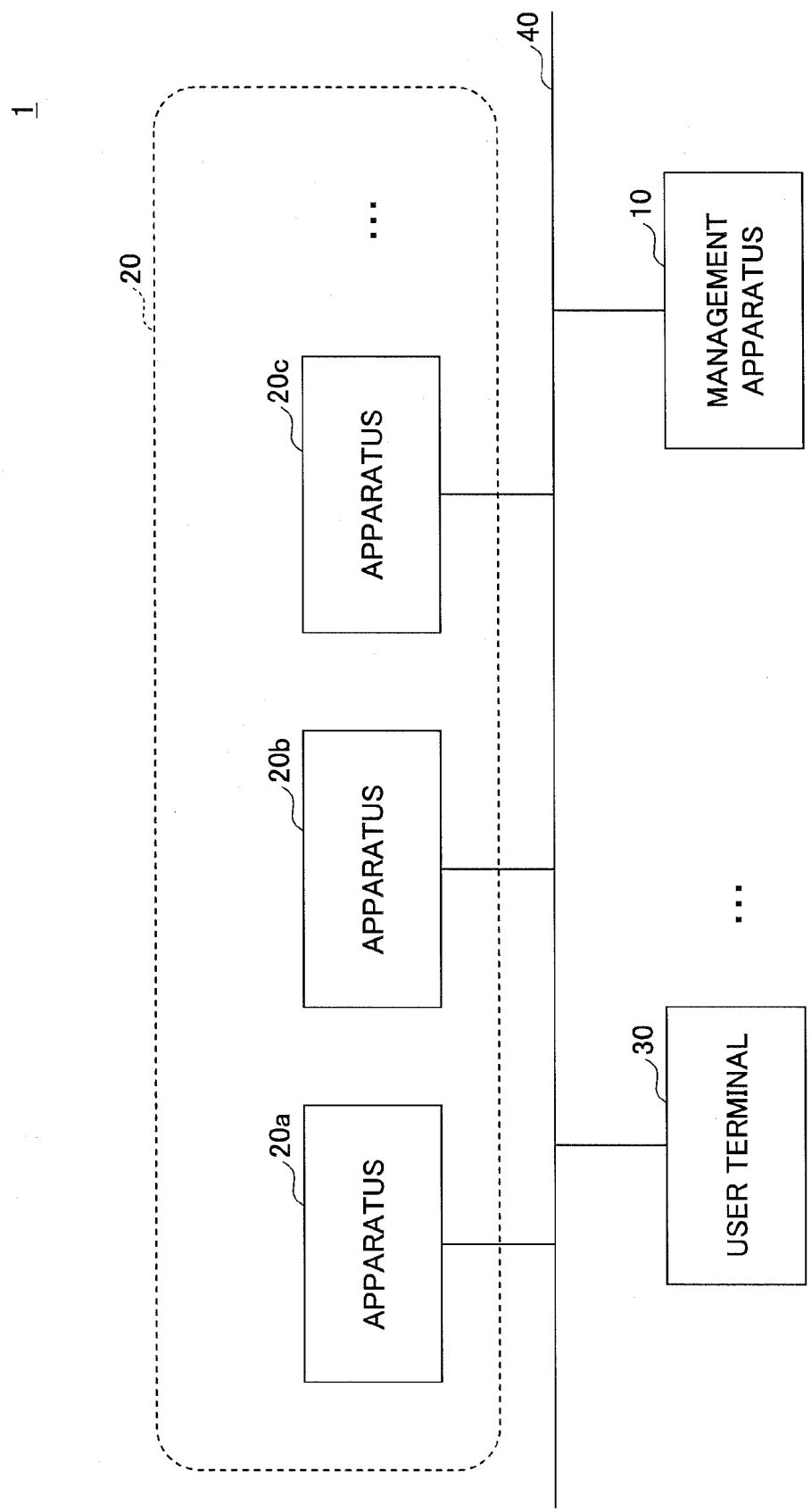
FIG. 1 is a diagram illustrating an example of a structure of a power consumption monitoring system in one embodiment of the present invention.

A description will be given of embodiments of the information processing apparatus, the information processing system, and the computer-readable recording medium according to the present invention, by referring to the drawings. FIG. 1 is a diagram illustrating an example of a structure of a power consumption monitoring system in one embodiment of the present invention. In a power consumption monitoring system 1 illustrated in FIG. 1, a management apparatus 10 may be connected to one or more apparatuses 20 (apparatuses 20a, 20b, 20c, etc.) via a network 40, such as a LAN (Local Area Network) and the like. The network 40 may be a cable network, a wireless network, or a combination of cable and wireless networks. The management apparatus 10 may also be connected to one or more user terminals 30 via the network 40.

The apparatus 20 may be formed by an image forming apparatus, a projector, and the like that consume power. The image forming apparatus may include a printer, a copying machine, a facsimile machine, a MFP, and the like. The management apparatus 10 may be formed by a computer that monitors an amount of power consumption of each apparatus 20 and outputs monitored results. The user terminal 30 may be formed by an information processing apparatus that functions as a user interface, such as an input apparatus, an output apparatus, and the like in the power consumption monitoring system 1. In other words, the user terminal 30 may accept an instruction (hereinafter also referred to as "user instruction") from the user, and send to the management apparatus 10 a processing request according to the user instruction. The user terminal 30 may display processed results received from the management apparatus 10. Examples of the user terminal 30 may include a PC (Personal Computer), a cellular phone, a smart phone, a PDA (Personal Digital Assistant), a tablet terminal, and the like.

Figure 2:
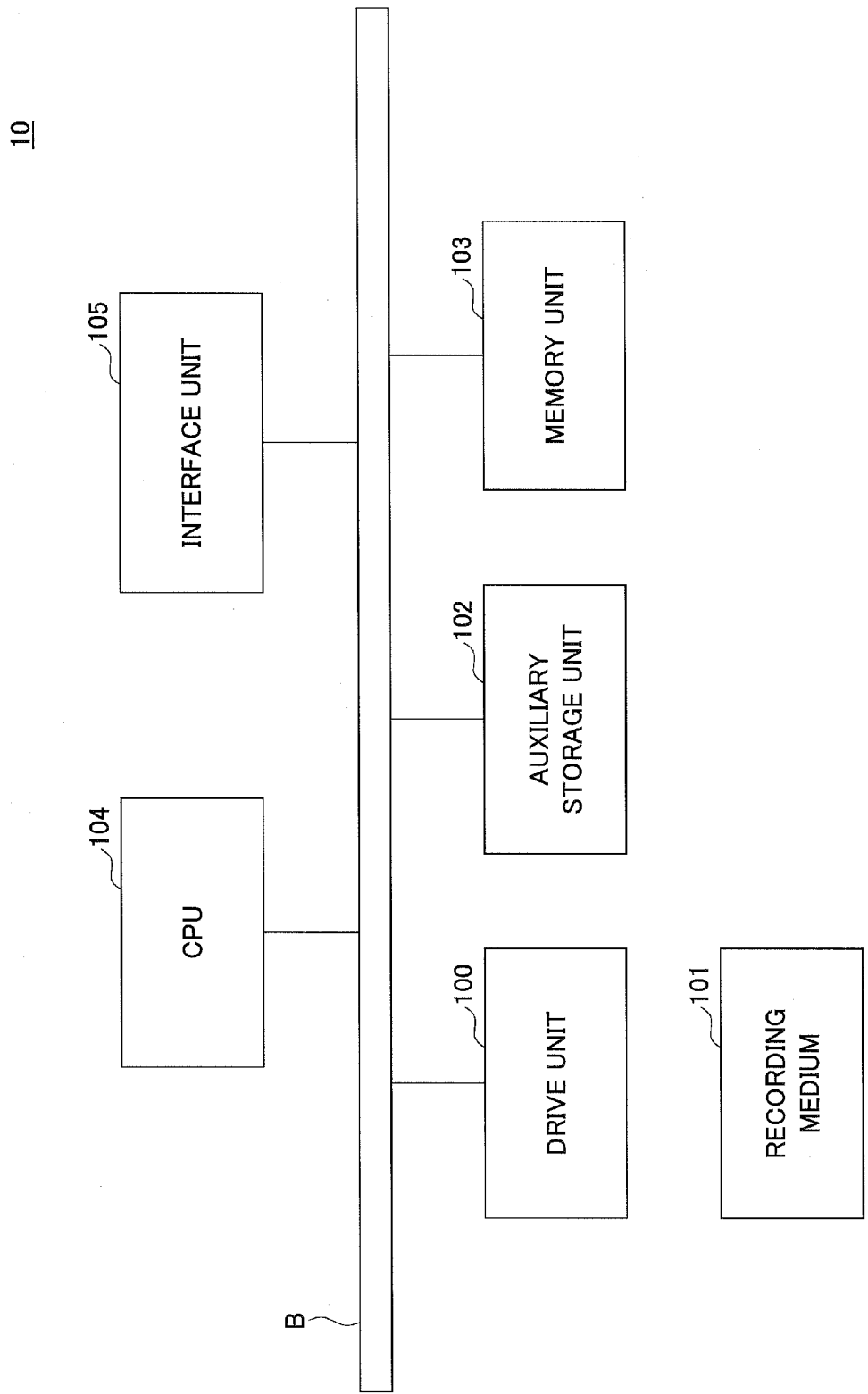
FIG. 2 is a diagram illustrating an example of a hardware structure of a management apparatus in one embodiment of the present invention.

FIG. 2 is a diagram illustrating an example of a hardware structure of the management apparatus in one embodiment of the present invention. The management apparatus 10 illustrated in FIG. 2 may include a drive unit 100, an auxiliary storage unit 102, a memory unit 103, a CPU (Central Processing Unit) 104, an interface unit 105, and the like that are mutually connected via a bus B.

A program that realizes processes of the management apparatus 10 may be stored in a non-transitory computer-readable recording medium 101 such as a CD-ROM (Compact Disk Read Only Memory) and the like. When the recording medium 101 that stores the program is set in the drive unit 100, the program is installed from the recording medium 101 via the drive unit 100 to the auxiliary storage unit 102. The installing of the program is not limited to that using the recording medium 101, and the program may be downloaded from another computer via a network, for example. The auxiliary storage unit 102 may store, in addition to the installed program, files, data, and the like that may be required.

The memory unit 103 may read the program from the auxiliary storage unit 102 in response to a program start instruction, and store the read program. The CPU 104 may execute the program stored in the memory unit 102, in order to perform functions of the management apparatus 10. The interface unit 105 may provide an interface to connect the management apparatus 10 to a network.

Figure 3:
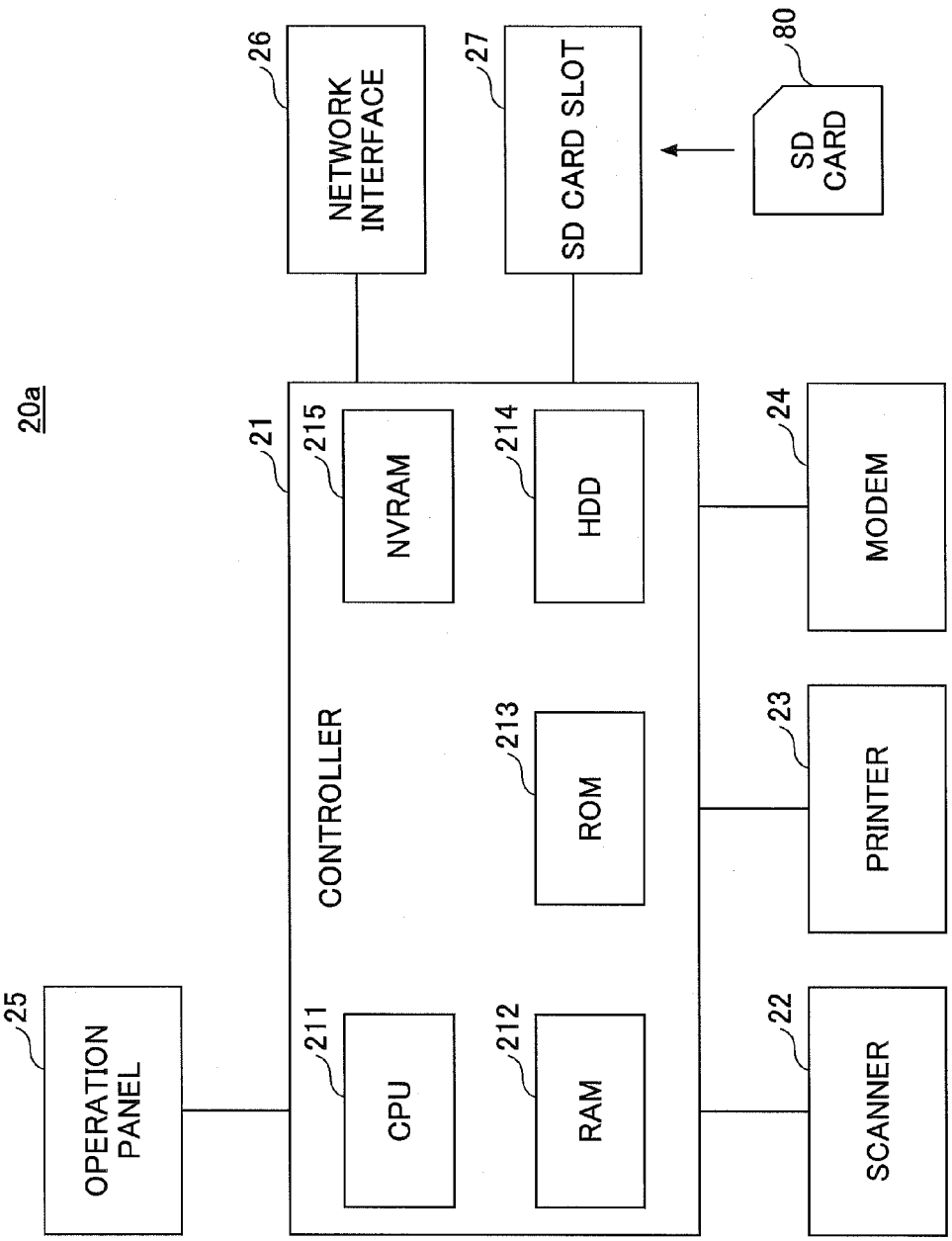
FIG. 3 is a diagram illustrating an example of a hardware structure of an apparatus in one embodiment of the present invention.

FIG. 3 is a diagram illustrating an example of a hardware structure of the apparatus in one embodiment of the present invention. In FIG. 3, it is assumed for the sake of convenience that the apparatus 20a is a MFP.

The apparatus 20a illustrated in FIG. 3 may include hardware such as a controller 21, a scanner 22, a printer 23, a modem 24, an operation panel 25, a network interface 26, an SD (Secure Digital) card slot 27, and the like.

The controller 21 may include a CPU 211, a RAM (Random Access Memory) 212, a ROM (Read Only Memory) 213, an HDD (Hard Disk Drive) 214, an NVRAM (Non-Volatile Random Access Memory) 215, and the like. The ROM 213 may store various programs, data used by the programs, and the like. The RAM 212 may provide a storage region to load the program, a work region to be used by the loaded program, and the like. The CPU 211 may execute the program loaded in the RAM 212, in order to realize various functions of the apparatus 20a. The HDD 214 may store the various programs, the data used by the programs, and the like. The NVRAM 215 may store various setting information and the like.

The scanner 22 may provide hardware (image reading unit or means) to read image data from a document. The printer 23 may provide hardware (printing unit or means) to print printing data on a printing sheet such as paper. The modem 24 may provide hardware enabling connection to a telephone line, and may be used to transmit and receive image data in facsimile communications. The operation panel 25 may provide hardware including an input unit or means, and a display unit or means. The input unit or means may include buttons and the like to accept inputs from the user. The display unit or means may be formed by a liquid crystal display panel and the like. The liquid crystal display panel may include functions of a touchscreen panel. In this case, the liquid crystal display panel may function as both the input unit or means and the display unit or means. The network interface 26 may provide hardware to connect the apparatus 20a to a network such as a LAN and the like, and the network in this case may be a cable network, a wireless network, or a combination if cable and wireless networks. The SD card slot 17 may provide hardware to read one or more programs stored in a SD card 80. Hence, in the apparatus 20a, not only the program stored in the ROM 213 but also the program stored in the SD card 80 may be loaded to the RAM 212 to be executed by the CPU 211. The SD card 80 may be replaced by other recording media, such as a CD-ROM, a USB (Universal Serial Bus) memory, and the like. In other words, the type of recording medium that may replace the SD card 80 is not limited to a particular type. The SD card slot 27 may be appropriately modified by hardware to suit the type of recording medium used.

Figure 4:
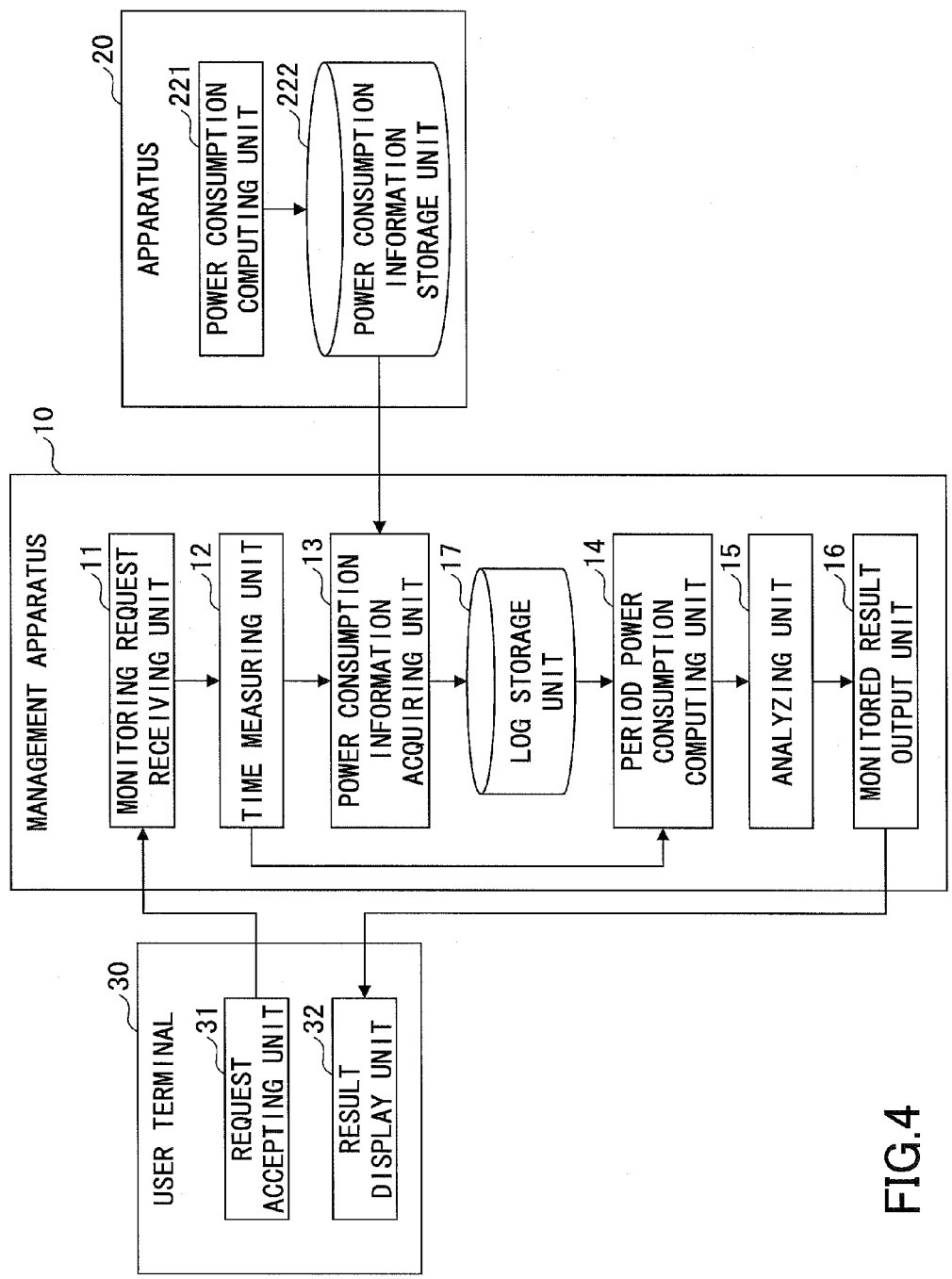
FIG. 4 is a diagram illustrating an example of a functional structure of the power consumption monitoring system in a first embodiment.

FIG. 4 is a diagram illustrating an example of a functional structure of the power consumption monitoring system in a first embodiment.

In FIG. 4, the apparatus 20 may include a power consumption computing unit 221, a power consumption information storage unit 222, and the like. The power consumption computing unit 221 may compute (or measure) the amount of power consumption for each power supply state of the apparatus 20, and store the computed (or measured) value in the power consumption information storage unit 222. The power consumption information storage unit 222 may store an accumulated value of the amount of power consumption for each power supply state.

The power supply state refers to a state of the apparatus 20 related to the power consumption. In this embodiment, the apparatus 20 may assume one of four power supply states, namely, a working state, a standby state, a power saving state, and a power OFF state. However, these power supply states are only examples, and the categorization of the power supply states may differ depending on the type of the apparatus 20 and the like.

The working state refers to a state in which an engine unit such as the scanner 22, the printer 23, and the like is operating, that is, a state in which a function of the apparatus 20 is being executed. The standby state refers to a state in which the engine unit is in a standby, or a state in which the power supplied to the engine unit is less than or equal to a predetermined amount, or a quiet state of the engine unit. The power saving state refers to a state in which not only the engine unit but also the controller 21 is in the standby state. The power OFF state refers to a state in which the main power is OFF.

Accordingly, a relationship of the power consumptions in each of the power supply states becomes as follows.

[Working State]>[Standby State]>[Power Saving State]>[Power OFF State]

The power consumption computing unit 221 computes the amount of power consumption during a time period (hereinafter also referred to as "computing time") until the power supply state changes (or makes a transition), periodically or every time the power supply state of the apparatus 20 changes, for example. Amongst accumulated values of the amount of power consumption stored in the power consumption information storage unit 222 for each of the power supply states, the power consumption computing unit 221 adds the computed result of the amount of power consumption during the computing time, with respect to an accumulated value for the power supply state corresponding to the computing time.

For example, an anticipated power consumption for each power supply state may be set for each type of the apparatus 20. The power consumption computing unit 221 may compute the amount of power consumption during each computing time based on the following formula, for example.

[Amount of Power Consumption ($Wh$)]=[Anticipated Power Consumption ($W$) For Power Supply State During Computing Time]×[Length (min) of Computing Time]/60

For example, the process of the power consumption computing unit 221 may be realized when the CPU 211 executes the program installed in the apparatus 20. The power consumption information storage unit 222 may be realized using the HDD 214 and the like.

The user terminal 30 may include a request accepting unit 31, a result display unit 32, and the like. The request accepting unit 31 may accept monitoring request from the user, requesting the amount of power consumption of the apparatus 20 to be monitored, and send the monitoring request to the management apparatus 10.

The result display unit 32 may display processed results of processes executed by the management apparatus 10 in response to the monitoring request. For example, processes of the request accepting unit 31 and the result display unit 32 may be realized when the user terminal 30 executes the program installed in the user terminal 30.

The management apparatus 10 may include a monitoring request receiving unit 11, a time measuring unit 12, a power consumption information acquiring unit 13, a period power consumption computing unit 14, an analyzing unit 15, a monitored result output unit 16, and the like. For example, processes of these units 11 through 16 may be realized when the CPU 104 executes one or more programs installed in the management apparatus 10. The management apparatus 10 may utilize a log storage unit 17. The log storage unit 17 may be realized by the auxiliary storage unit 102, or a storage unit and the like connected to the management apparatus 10 via a network.

The monitoring request receiving unit 11 may receive the monitoring request received from the user terminal 30. The time measuring unit 12 may measure a lapse of a time interval (hereinafter also referred to as "acquiring interval") with which information stored in the power consumption information storage unit 222 of the apparatus 20 is acquired. Every time the acquiring interval elapses, the time measuring unit 12 may notify the power consumption information acquiring unit 13 of this lapse of the acquiring interval, In addition, the time measuring unit 12 may also measure a lapse of a unit time (hereinafter also referred to as "analyzing time period") in which the information acquired from the apparatus 20 is analyzed. Every time the analyzing time period elapses, the time measuring unit 12 may notify the analyzing unit 15 of this lapse of the analyzing time period.

The power consumption information acquiring unit 13 may acquire the information stored in the power consumption information storage unit 222 of the apparatus 20, depending on the notification from the time measuring unit 12 notifying the lapse of the acquiring interval. In other words, the accumulated value of the amount of power consumption for each power supply state of the apparatus 20 may be acquired at each point in time. The power consumption information acquiring unit 13 may store the acquired information in the log storage unit 17.

The log storage unit 17 may store a log of the information acquired by the power consumption information acquiring unit 13.

The period power consumption computing unit 14 may compute the amount of power consumption for each power supply state during the analyzing time period. The analyzing unit 15 may compute a ratio of the amount of power consumption for each power supply state during the analyzing time period. The ratio may be normalized in proportion to a total amount of power consumption (total value of the amount of power consumption for each of the power supply states) during the analyzing time period, which is set to 100.

The monitored result output unit 16 may send the computed results from the analyzing unit 15 to the user terminal 30.

Figure 5:
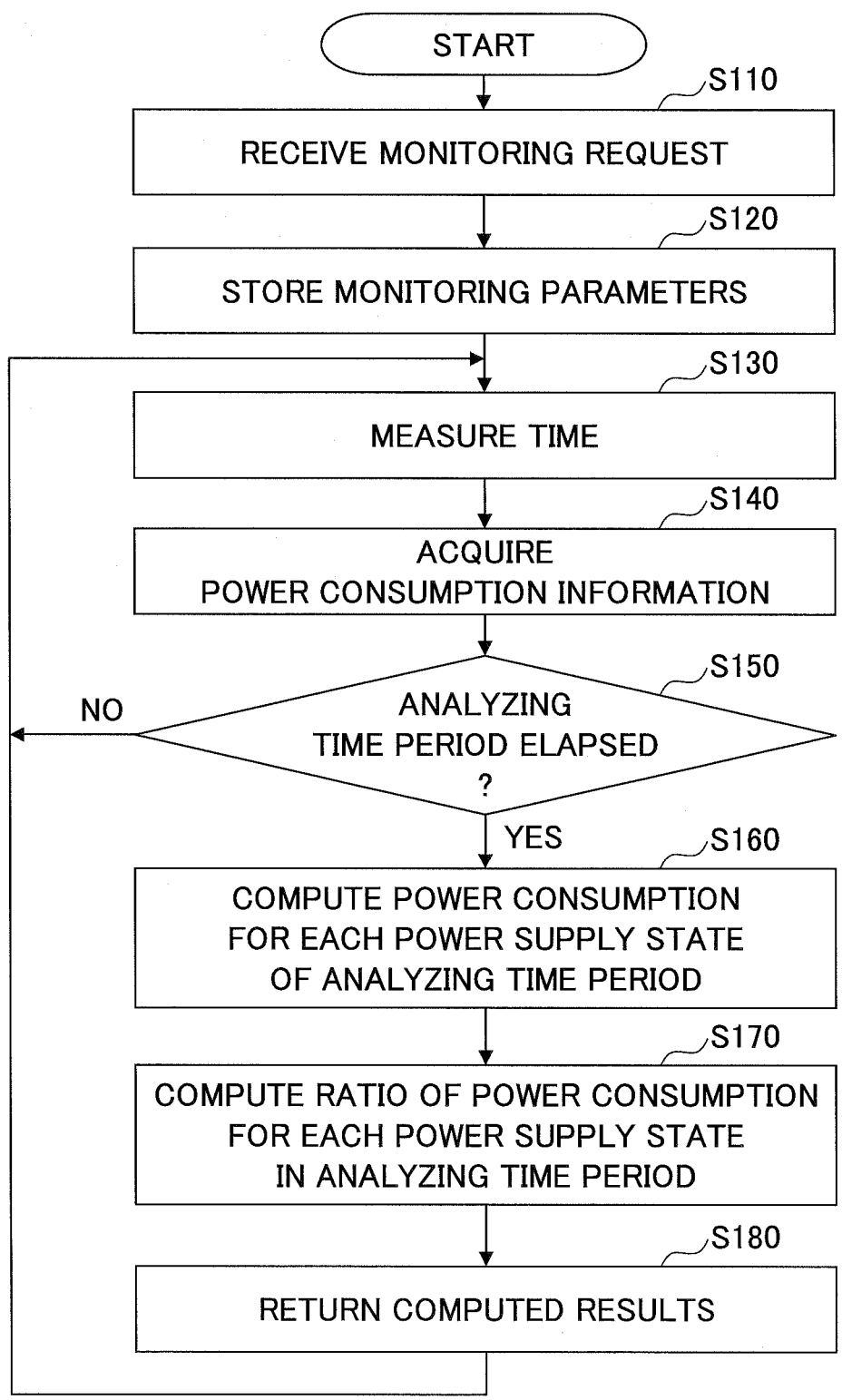
FIG. 5 is a flow chart for explaining an example of a processing procedure executed by the management apparatus in the first embodiment.

Next, a description will mainly be given of a processing procedure executed by the management apparatus 10. FIG. 5 is a flow chart for explaining an example of the processing procedure executed by the management apparatus in the first embodiment.

In step S110 illustrated in FIG. 5, the monitoring request receiving unit 11 receives the monitoring request for the amount of power consumption of the apparatus 20. For example, the monitoring request may be sent from the monitoring request accepting unit 31 of the user terminal 30 according to an input that is made with respect to a monitoring parameter setting screen that is displayed on the user terminal 30 by the monitoring request accepting unit 31.

Figure 6:
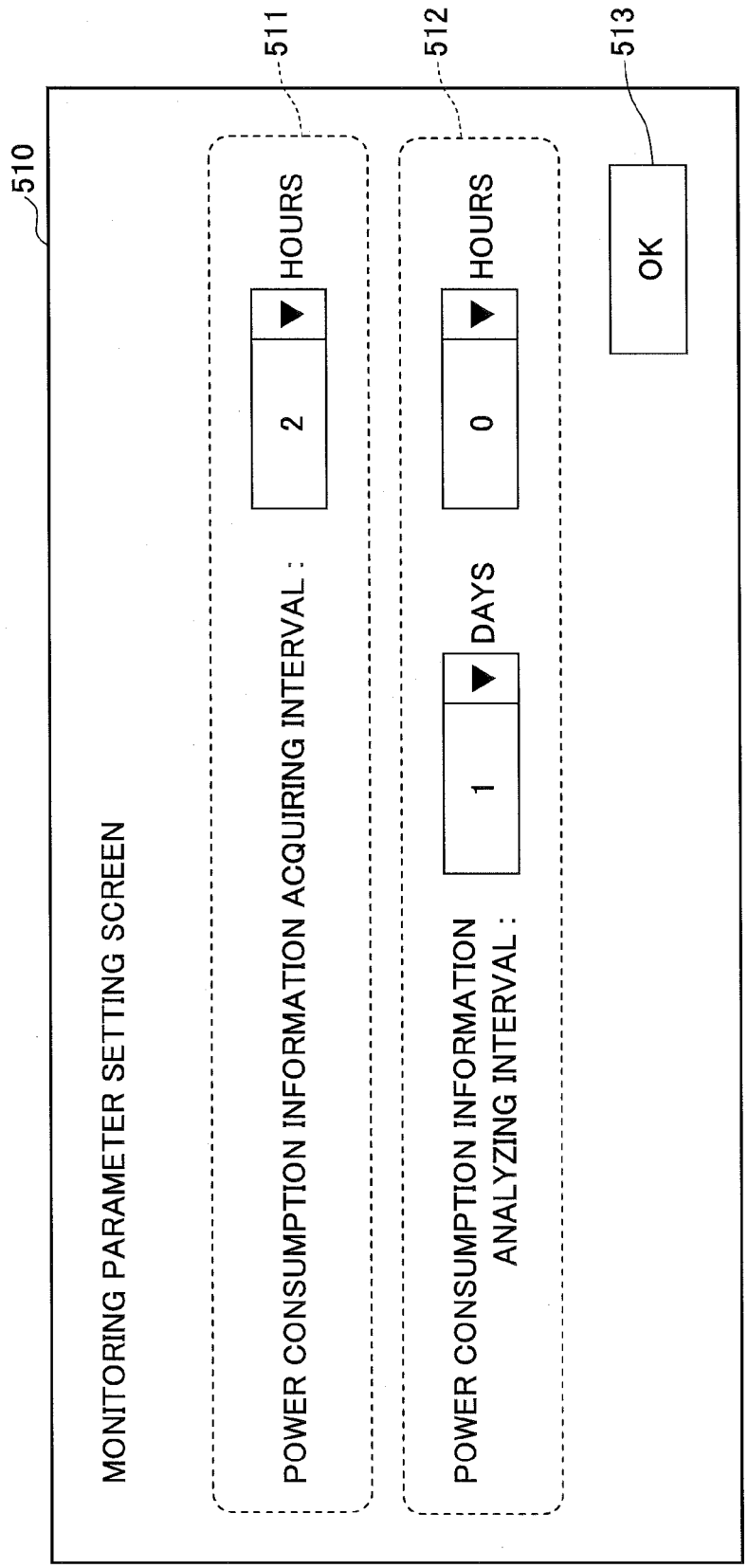
FIG. 6 is a diagram illustrating an example of a display on a monitoring parameter setting screen.

FIG. 6 is a diagram illustrating an example of a display on the monitoring parameter setting screen. In FIG. 6, a monitoring parameter setting screen 510 may include a setting region 511, a setting region 512, and the like.

The acquiring interval of the power consumption information ("acquiring interval" described above) may be set to the setting region 511. FIG. 6 illustrates an example in which 2 hours is set as the acquiring interval.

The analyzing time period of the power consumption information ("analyzing time period" described above) may be set to the setting region 512. FIG. 6 illustrates an example in which which 1 day (=24 hours) is set as the analyzing time period. Each acquiring interval and each analyzing time period may be set as the acquiring interval and the analyzing time period.

When the acquiring interval and the analyzing time period are set on the monitoring parameter setting screen 510 and an OK (or submit) button 513 is pushed, the request accepting unit 31 of the user terminal 30 sends the monitoring request, including the set acquiring interval and the set analyzing time period, to the management apparatus 10 in step S110.

Next, the monitoring request accepting unit 11 stores the acquiring interval, the analyzing time interval, and the like included in the received monitoring request in the memory unit 103, for example (step S120).

Then, the time measuring unit 12 starts measuring the acquiring interval and the analyzing time period using a current time as a starting point, for example (step S130). When the acquiring interval elapses from the starting point of the measurement or from the lapse of the previous acquiring interval, the power consumption information acquiring unit 13 acquires the power consumption information from the power consumption information storage unit 222 of each apparatus 20 (step S140). The power consumption information acquiring unit 13 stores the acquired power consumption information in the log storage unit 17.

FIG. 7 is a diagram illustrating an example of a structure of the log storage unit. In FIG. 7, each record stored in the log storage unit 17 may include items such as the date (or date and time), the apparatus name, and the amount of power consumption of each power supply state. One record may be generated by one acquisition of the power consumption information, and include a common date (or date and time). One date (that is, one record) may include a plurality of apparatus names, because the power consumption information may be acquired simultaneously from a plurality of apparatuses 20.

The date (or date and time) may refer to the date (or date and time) when the power consumption information is acquired. The apparatus name may refer to an identification name of the apparatus 20 from which the power consumption information is acquired. The identification name may include an IP (Internet Protocol) address, or a URL (Uniform Resource Locator), or any suitable information enabling identification of each apparatus 20. The identification name of each apparatus 20 from which the power consumption information is acquired may be stored in the auxiliary storage unit 102.

By executing step S140 once, the record including the accumulated value of the amount of power consumption for each power supply state with respect to each apparatus 20 may be added to the log storage unit 17. An accumulating time period of the accumulated value may be from a time when the apparatus 20 is introduced until the current time, or from a time when the apparatus 20 is started until the current time.

Steps S130 and S140 are repeated until the analyzing time period elapses from the starting point of the measurement or from the lapse of the previous acquiring interval (step S150). As a result, the acquired power consumption information is accumulated in the log storage unit 17 every time the analyzing time period elapses from the starting point, for example.

When the analyzing time period elapses from the starting point (YES in step S150), for example, the period power consumption computing unit 14 computes a difference between the accumulated value of the amount of power consumption included in the record stored last in the log storage unit 17 during the analyzing time period and the accumulated value of the amount of power consumption stored first in the log storage unit 17 during the analyzing time period, for each apparatus 20 and for each power supply state (step S160). As a result, the amount of power consumption is computed for each apparatus 20 and for each power supply stage during the analyzing time period. In addition, the period power consumption computing unit 14 computes a total value of the amount of power consumption for each apparatus 20 during the analyzing time period. This total value may be computed from a sum total of the amount of power consumption for each power supply state.

FIG. 8 is a diagram illustrating an example of computed results for the amount of power consumption in one analyzing time period. As illustrated in FIG. 8, the computed results in step S160 may include the amount of power consumption for each power supply state during the analyzing time period, and the total amount of power consumption, for each apparatus 20.

Next, based on the computed results of step S160, the analyzing unit 15 computes the ratio with respect to the total value, for the amount of power consumption for each power supply state during the analyzing time period with respect to each apparatus 20 (step S170). More particularly, the ratio of the amount of power consumption for each power supply state is computed by dividing amount of power consumption for each power supply state by the total value with respect to each apparatus 20.

FIG. 9 is a diagram illustrating an example of the computed results for the ratio of the amount of power consumption in one analyzing time period. FIG. 9 illustrates the computed results for the ratio of the amount of power consumption for each power supply state with respect to each apparatus 20, based on the example illustrated in FIG. 8.

Next, the monitored result output unit 16 returns, to the user terminal 30 at the source of the monitoring request, a response including the computed results for the ratio of the amount of power consumption for each power supply state with respect to each apparatus 20 (step S180).

Figure 10:
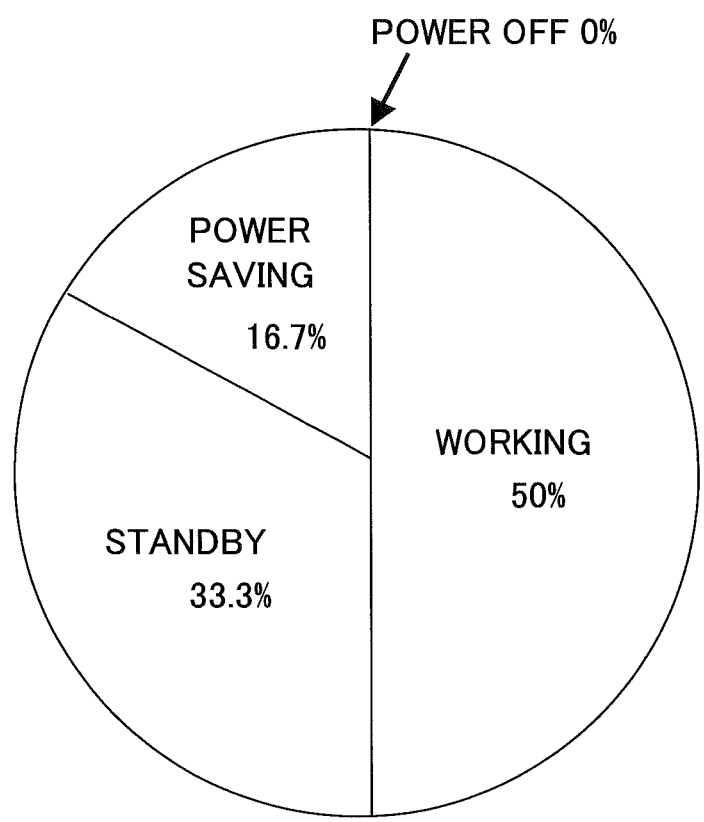
FIG. 10 is a diagram illustrating an example of a display of the computed results for the ratio of the amount of power consumption for each power supply state.

The result display unit 32 of the user terminal 30 may display the computed results included in the response received from the management apparatus 10 with a format illustrated in FIG. 10, for example.

FIG. 10 is a diagram illustrating an example of the display of the computed results for the ratio of the amount of power consumption for each power supply state. In FIG. 10, the computed results for the ratio of the amount of power consumption for each power supply state is represented by a circle graph (or pie chart), with respect to the apparatus 20 having the apparatus name "A" in FIG. 9. Of course, the computed results for the ratio of the amount of power consumption for each power supply state may be represented by other formats other than the circle graph, a bar graph, and the like.

The user may refer to the circle graph and easily comprehend the ratio of the amount of power consumption for each power supply state during the analyzing interval (for example 1 day). Accordingly, the user may easily comprehend the amount of power consumption for the power supply state that is high relative to other power supply states during the analyzing interval, for example.

Next, a description will be given of a second embodiment. In the second embodiment, only parts or functions different from those of the first embodiment will be described for the sake of convenience. Hence, those parts or functions that are not specifically described may be the same as those of the first embodiment.

Figure 11:
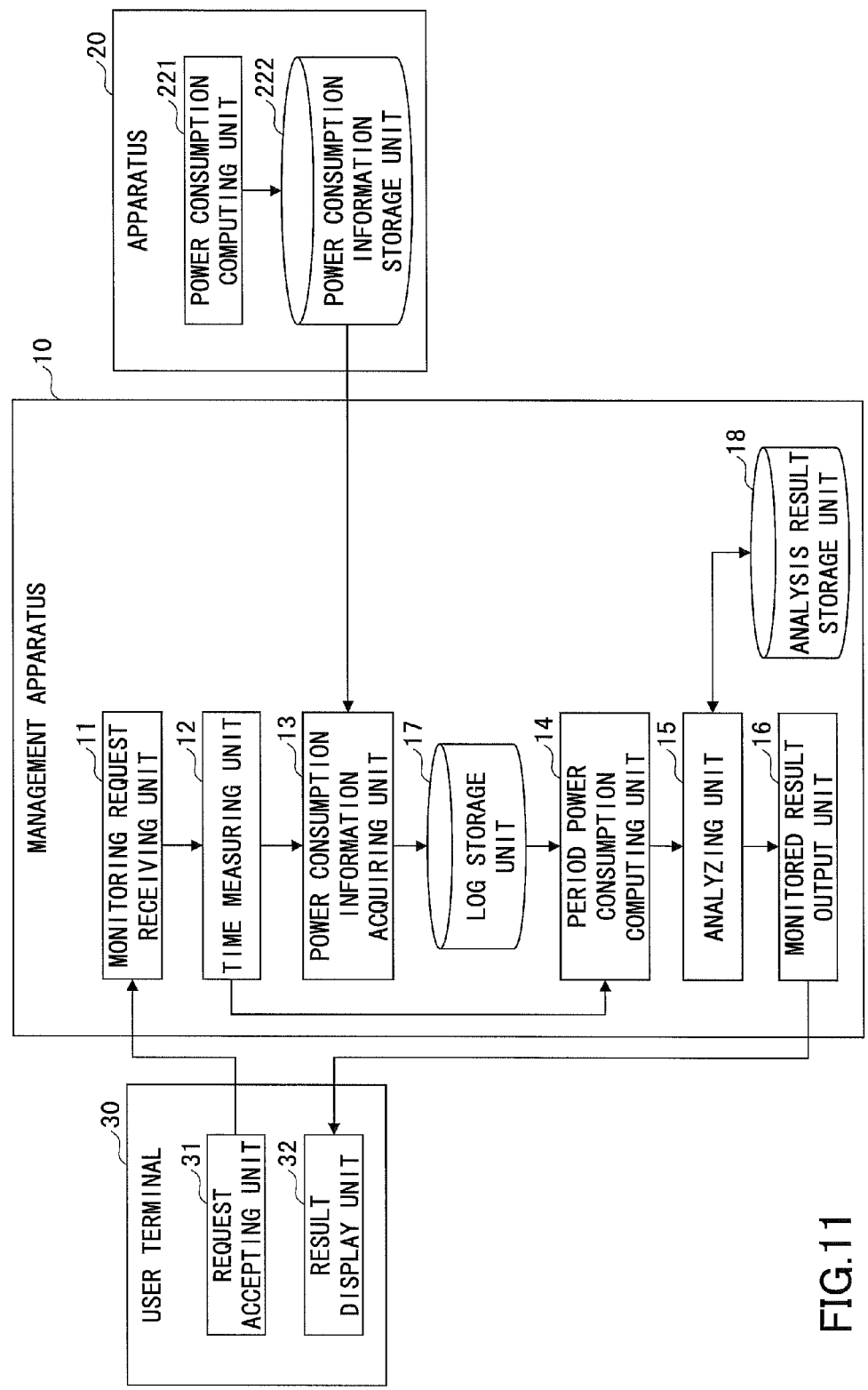
FIG. 11 is a diagram illustrating an example of the functional structure of the power consumption monitoring system in a second embodiment.

FIG. 11 is a diagram illustrating an example of the functional structure of the power consumption monitoring system in the second embodiment. In FIG. 11, those parts that are the same as those corresponding parts in FIG. 4 are designated by the same reference numerals, and a description thereof will be omitted.

In FIG. 11, the management apparatus 10 additionally includes an analysis result storage unit 18. The analysis result storage unit 18 may store a log of the computed results for each analyzing interval of the analyzing unit 15. The analysis result storage unit 18 may be realized by the auxiliary storage unit 102, or a storage unit and the like connected to the management apparatus 10 via a network.

Figure 12:
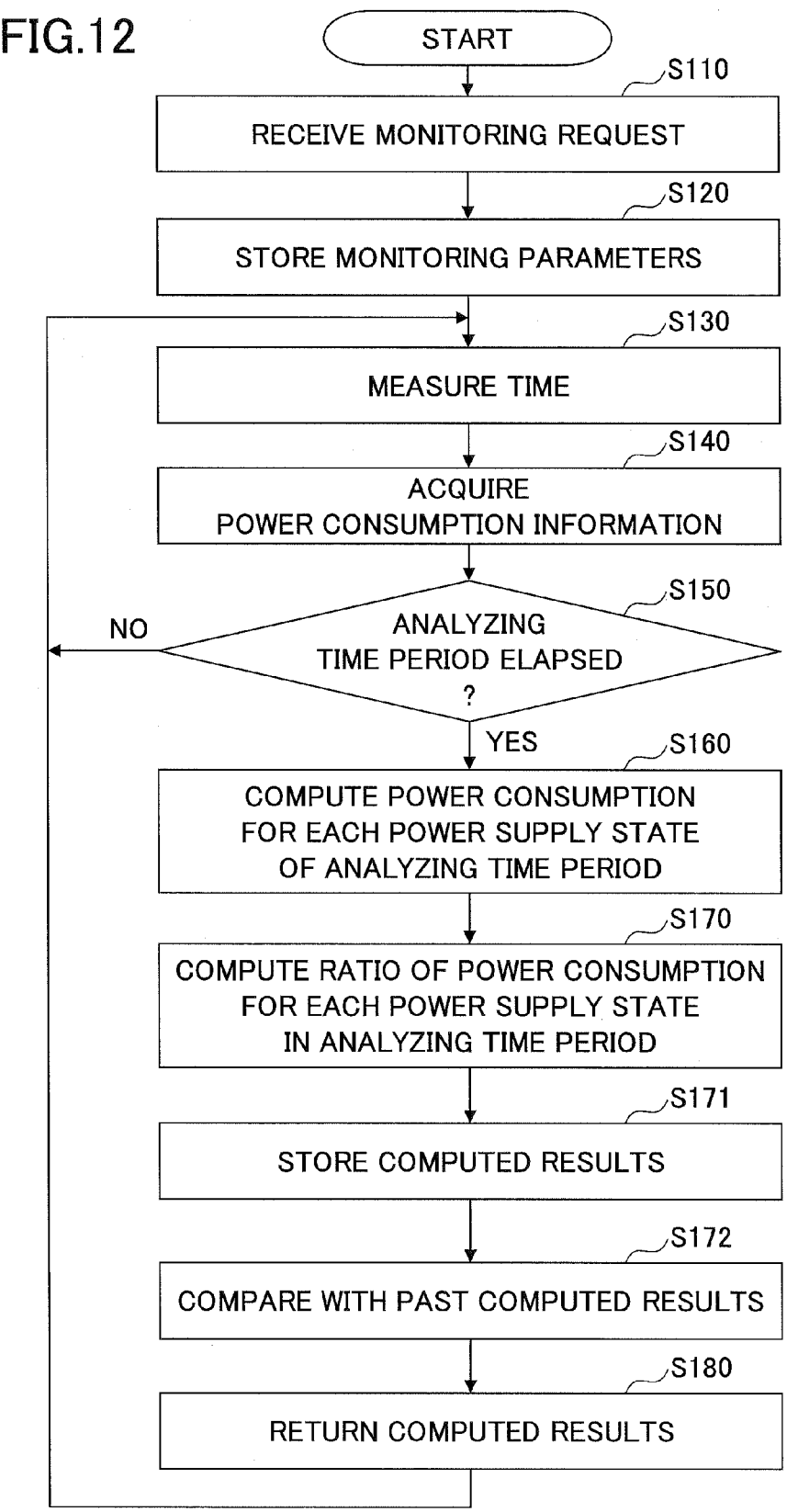
FIG. 12 is a flow chart for explaining an example of a processing procedure executed by the management apparatus in the second embodiment.

FIG. 12 is a flow chart for explaining an example of a processing procedure executed by the management apparatus in the second embodiment. In FIG. 12, those steps that are the same as those corresponding steps in FIG. 5 are designated by the same reference numerals, and a description thereof will be omitted.

The processing procedure illustrated in FIG. 12 additionally includes steps S171 and S172. In step S171, the analyzing unit 15 stores the computed results of step S170 in the analysis result storage unit 18. Hence, the analysis result storage unit 18 may store the ratio of the amount of power consumption for each power supply state computed for each analyzing interval, with respect to each apparatus 20.

Next, the analyzing unit 15 compares the computed results of step S170 related to the current analyzing interval and the computed results of step S170 related to the past (or previous) analyzing interval (step S172). The computed results related to the past analyzing interval may be acquired from the analysis result storage unit 18. For example, with respect to the computed results related to the current analyzing interval, a ratio with respect to the computed results related to the previous analyzing interval may be computed as a ratio to the previous power consumption.

More particularly, the ratio to the previous power consumption may be computed for each apparatus 20 and for each power supply state, according to the following formula, for example.

[Ratio (%) To Previous Power Consumption]=[Ratio (%) of Current Amount of Power Consumption]/[Ratio (%) of Previous Amount of Power Consumption]×100

FIGS. 13A, 13B, and 13C are diagrams for explaining an example of computed results in relation to previous computed results. FIG. 13A illustrates the computed results related to the previous analyzing interval, and contents illustrated in FIG. 13A are the same as the contents illustrated in FIG. 9. FIG. 13B illustrates the computed results related to the current analyzing interval. In this case, the computed results of step S172 become as illustrated in FIG. 13C, for example.

In FIG. 13C, a value of the working state is "80" for the apparatus name "A". This value "80" of the working state may be obtained by computing the following, where "40" is the value of the working state for the apparatus name "A" in FIG. 13B, and "50" is the value of the working state for the apparatus name "A" in FIG. 13A.

80=(40/50)×100

In step S180, a response returned to the user terminal 30 includes the computed results (FIGS. 13A and 13C) of step S172 in addition to the computed results (FIG. 13B) related to the current analyzing interval.

Figure 14:
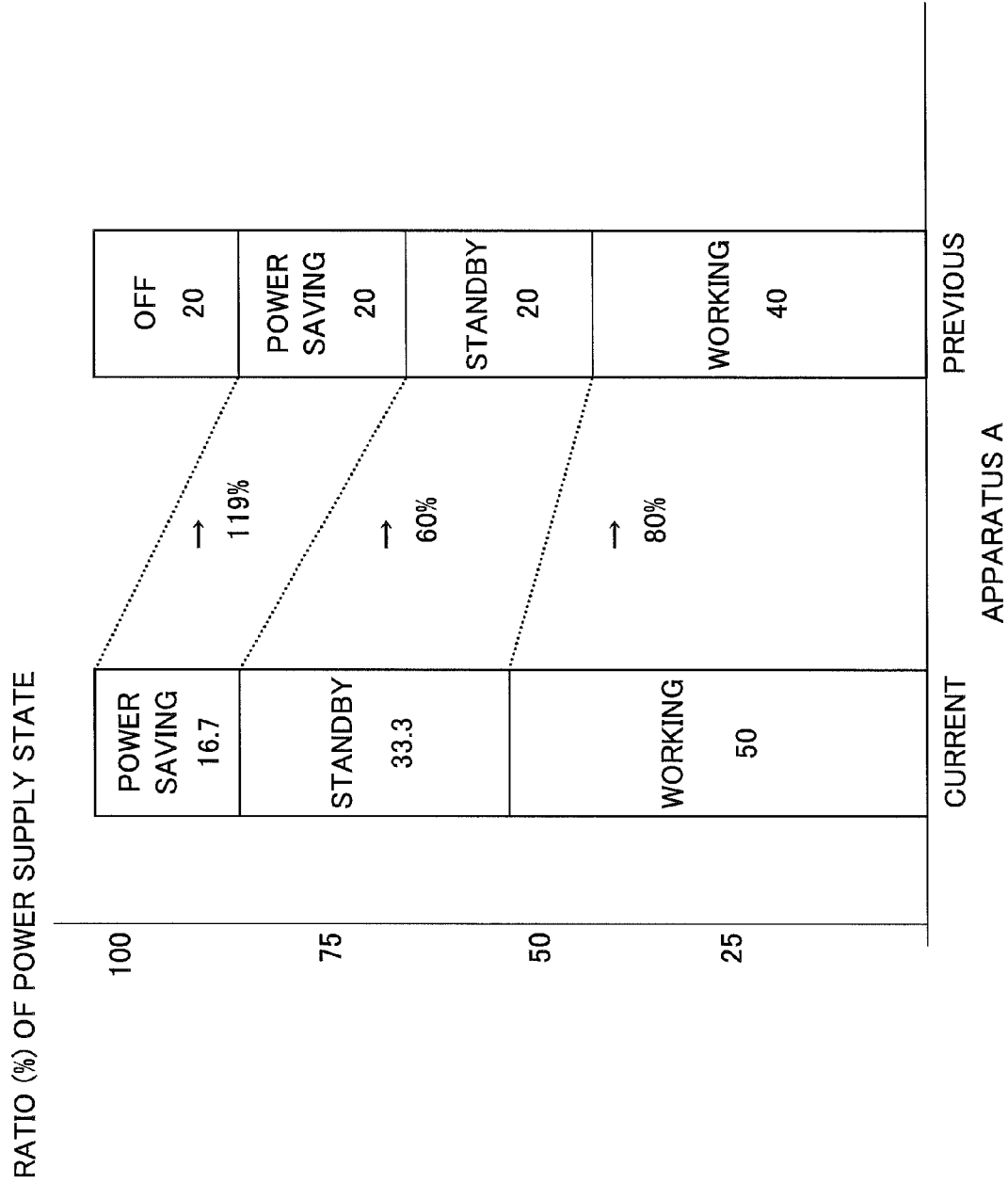
FIG. 14 is a diagram illustrating an example of a display of the computed results in relation to the previous computed results.

The result display unit 32 of the user terminal 30 may display the computed results included in the response with a format illustrated in FIG. 14, for example.

FIG. 14 is a diagram illustrating an example of the display of the computed results in relation to the previous computed results. In FIG. 14, information related to the apparatus name "A", amongst the contents illustrated in FIGS. 13A, 13B, and 13C, is represented by a bar graph. In other words, the ratio to the previous power consumption illustrated in FIG. 13C is displayed between a bar graph based on FIG. 13A and a bar graph based on FIG. 13B.

The user may refer to the bar graph and easily comprehend a change in the amount of power consumption for each power supply state between the previous analyzing interval and the current analyzing interval.

The analysis result storage unit 18 may store the computed results (refer to FIG. 8) of step S160. In this case, the ratio of the amount of power consumption for each apparatus 20 and for each power supply state may be computed spanning a plurality of analyzing intervals.

According to the second embodiment, the user may easily comprehend a change in the ratio of the amount of power consumption for each power supply state, in units of analyzing intervals.

Next, a description will be given of a third embodiment. In the third embodiment, only parts or functions different from those of the first embodiment will be described for the sake of convenience. Hence, those parts or functions that are not specifically described may be the same as those of the first embodiment.

Figure 15:
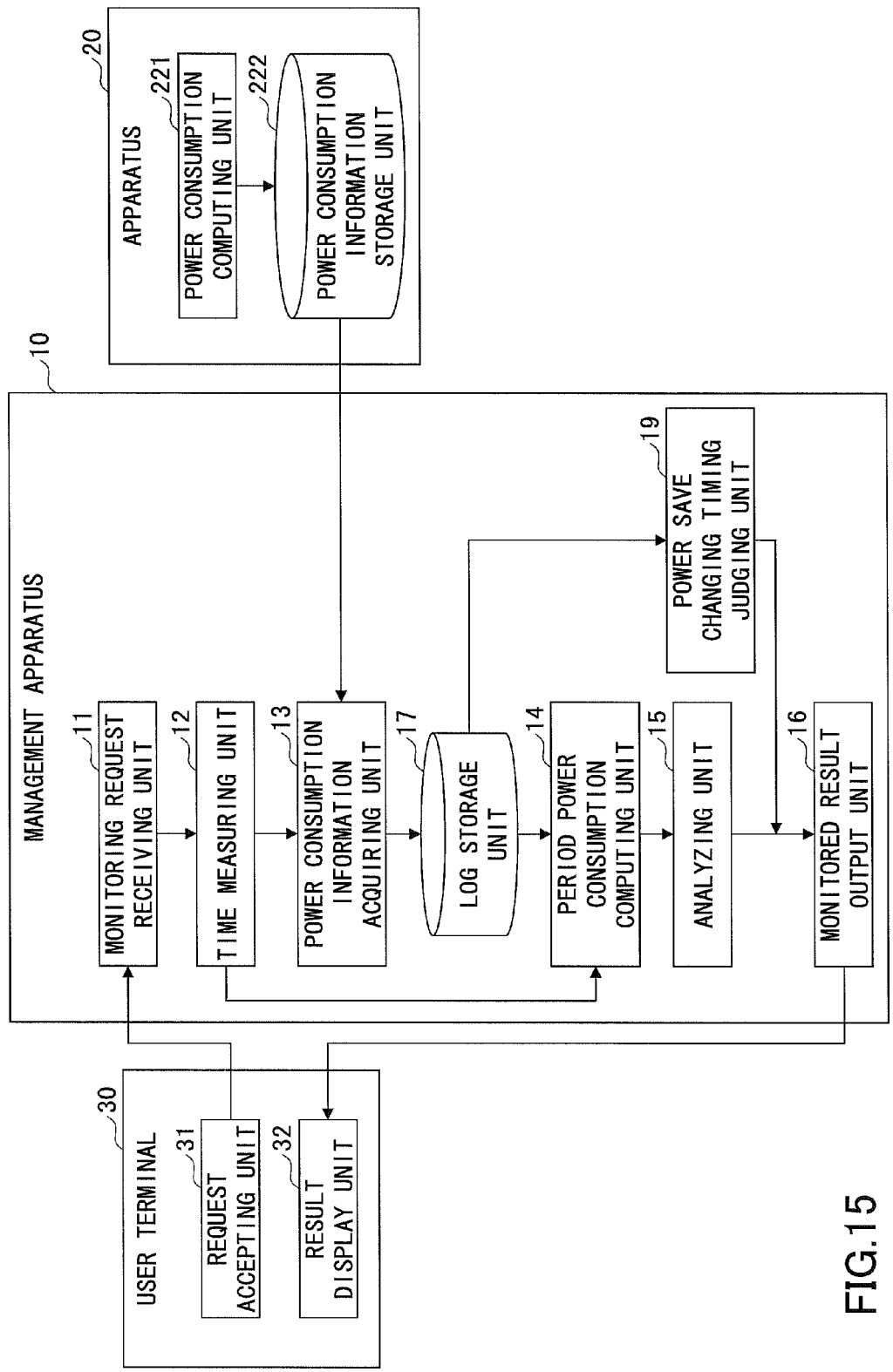
FIG. 15 is a diagram illustrating an example of the functional structure of the power consumption monitoring system in a third embodiment.

FIG. 15 is a diagram illustrating an example of the functional structure of the power consumption monitoring system in the third embodiment. In FIG. 15, those parts that are the same as those corresponding parts in FIG. 4 are designated by the same reference numerals, and a description thereof will be omitted.

In FIG. 15, the management apparatus 10 additionally includes a power save changing timing judging unit 19. The power save changing timing judging unit 19 may judge a recommended changing timing at which the power supply state may be changed to the power saving state, based on the information stored in the log storage unit 17. For example, the process of the power save changing timing judging unit 19 may be realized when the CPU 104 executes a program installed in the management apparatus 10.

Figure 16:
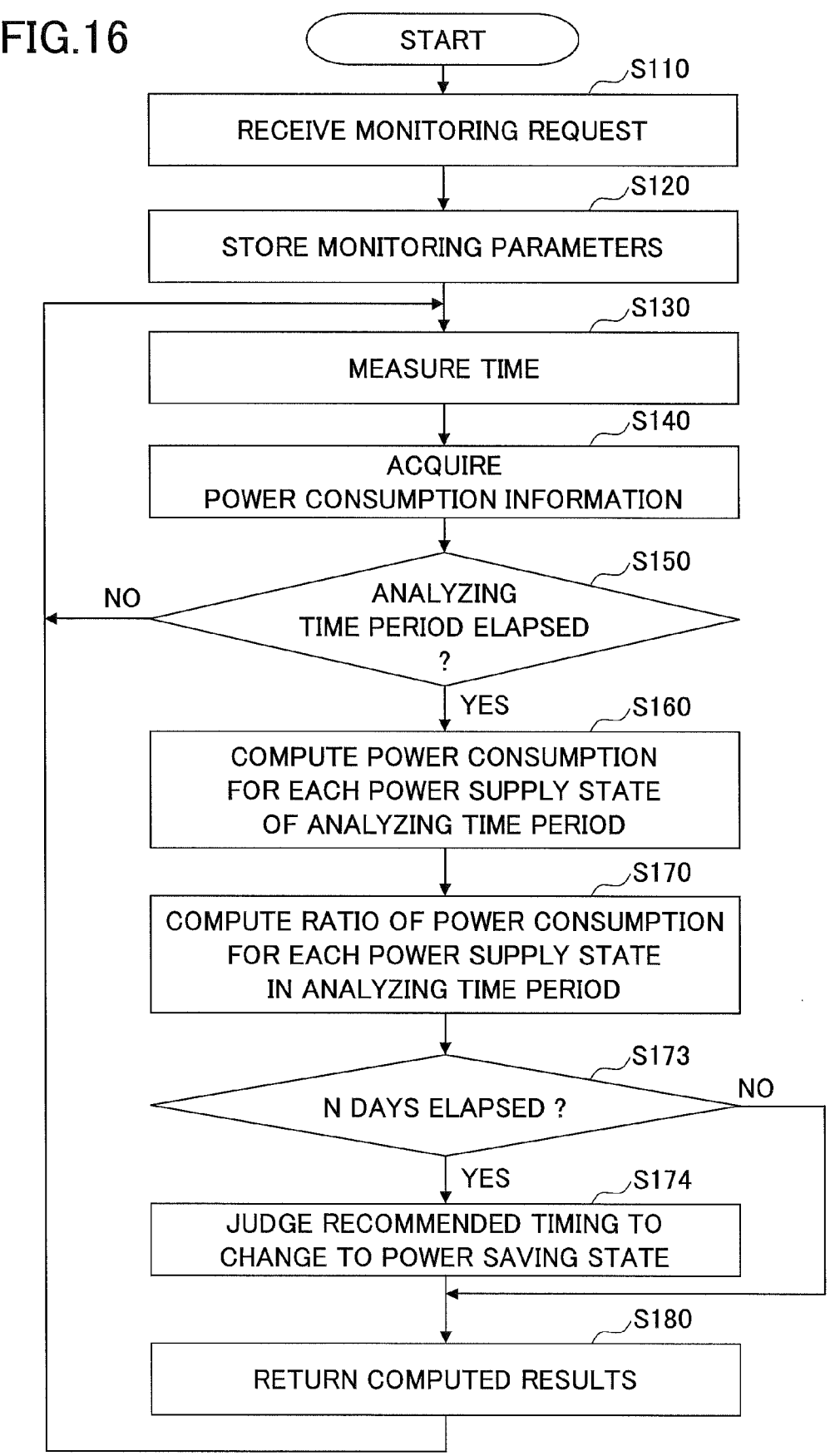
FIG. 16 is a flow chart for explaining an example of the processing procedure executed by the management apparatus in the third embodiment.

FIG. 16 is a flow chart for explaining an example of the processing procedure executed by the management apparatus in the third embodiment. In FIG. 16, those steps that are the same as those corresponding steps in FIG. 5 are designated by the same reference numerals, and a description thereof will be omitted.

The processing procedure illustrated in FIG. 16 additionally includes steps S173 and S174. In step S173, the power save changing timing judging unit 19 judges whether N days have elapsed from the start of the measurement, or after the previous N days have elapsed. For example, the power save changing timing judging unit 19 may judge whether the records amounting to N days for each time are stored in the log storage unit 17 (FIG. 7). Alternatively, the time measuring unit 12 may measure the lapse of N days. The value of N may be set as a parameter, for example.

When N days have elapsed (YES in step S173), the power save changing timing judging unit 19 executes a process to judge the recommended changing timing at which the power supply state may be changed to the power saving state (step S174). In step S180 that follows step S174, a response that includes the judgement result of step S174, in addition to the computed results (FIG. 13B) related to the current analyzing interval, is returned to the user terminal 30.

Figure 17:
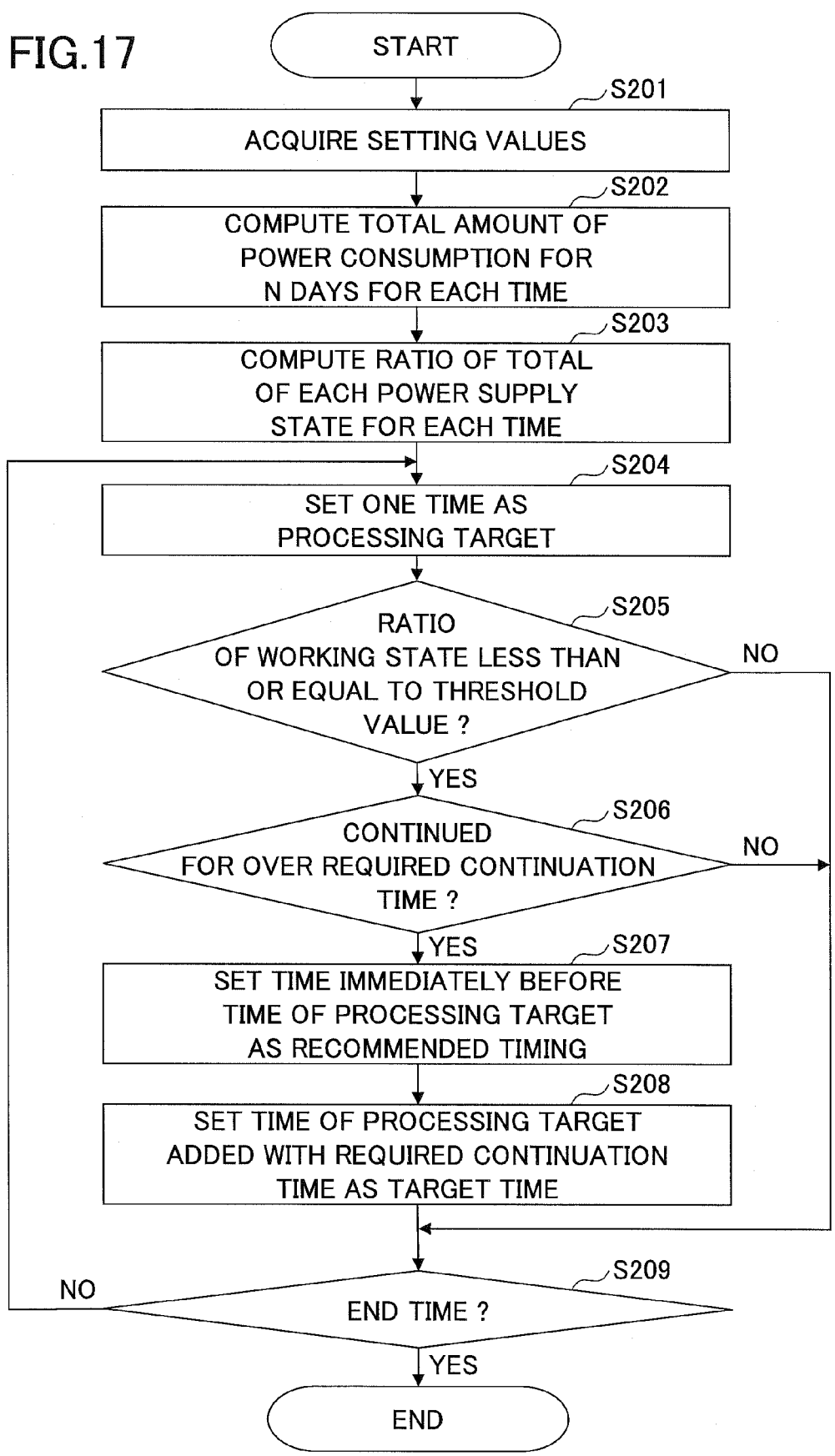
FIG. 17 is a flow chart for explaining an example of a processing procedure of a judging process to judge a recommended timing for changing to a power saving state.

Next, a more detailed description will be given of step S174. FIG. 17 is a flow chart for explaining an example of the processing procedure of the judging process to judge the recommended timing for changing to the power saving state.

The process illustrated in FIG. 17 is executed for each apparatus 20. In the following description, the apparatus 20 that is the processing target may also be referred to as the "target apparatus".

In step S201 illustrated in FIG. 17, the power save changing timing judging unit 19 acquires setting values required for the judging process thereof, from the auxiliary storage unit 102, for example. The setting values may include the value of N described above.

Next, the power save changing timing judging unit 19 computes the total value of the amount of power consumption for each power supply state related to the target apparatus, for the same time in each of the past N days (step S202). More particularly, the amount of power consumption for each power supply state at each time of the target apparatus may be computed for each power supply state by subtracting, from the amount of power consumption in the record of the target apparatus related to a certain time in the log storage unit 17 (FIG. 7), the amount of power consumption in the record of the target apparatus related to a time one previous to the certain time. The amount of power consumption computed for each time and for each power supply state may be totaled for the same time of the N days, in order to compute the total value described above. The value of N may be 1. In this case, the total value need not be computed.

Next, the power save changing timing judging unit 19 computes a ratio of each power supply state for each time, with respect to the total value of the amount of power consumption for each power supply state at each time of the past N days computed in step S202 (step S203). This ratio may be normalized in proportion to the total amount of power consumption (total value of the amount of power consumption for each of the power supply states) during the analyzing time period, which is set to 100.

Figure 18:
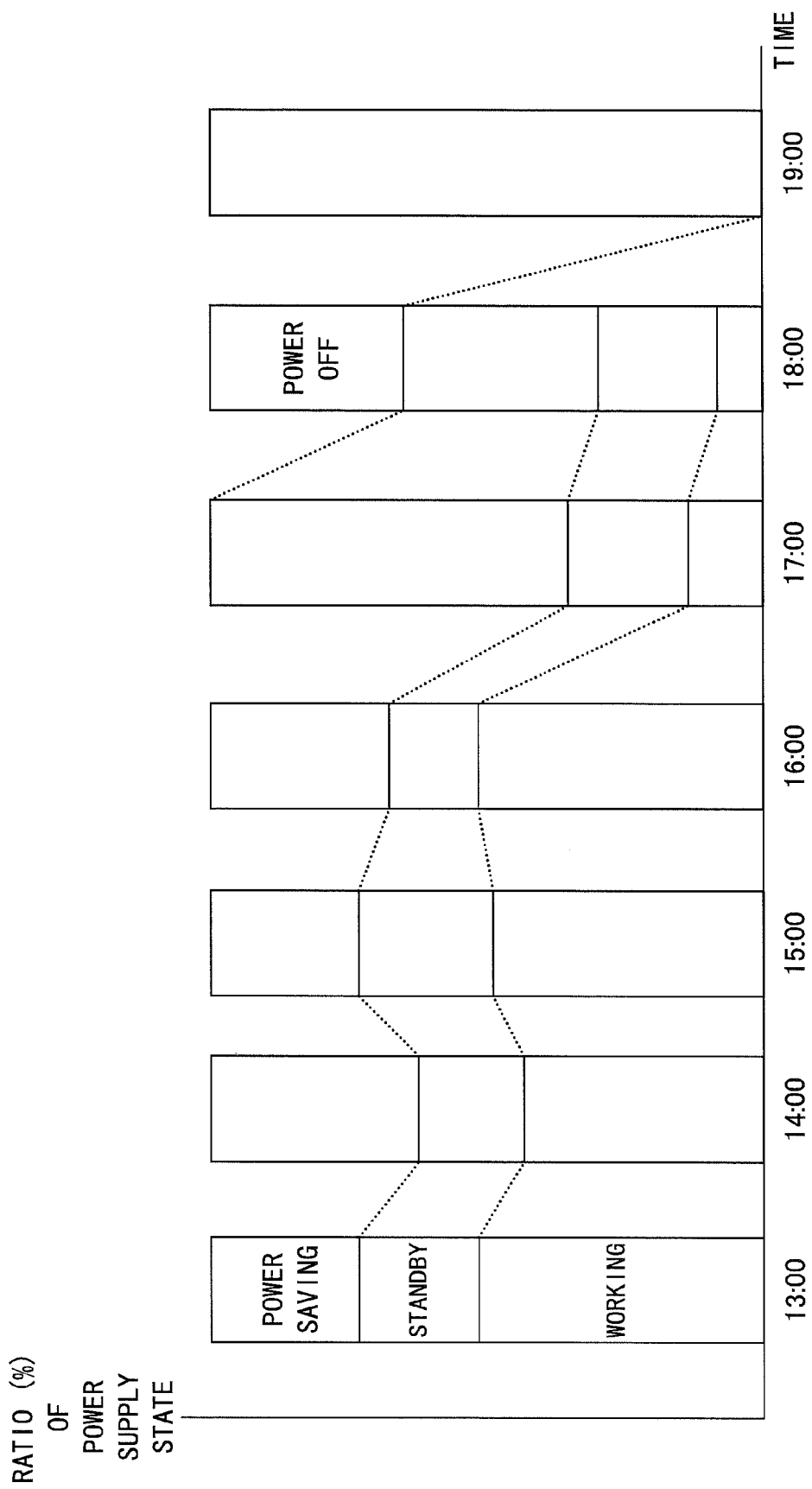
FIG. 18 is a diagram illustrating an example of a change in ratios of each of the power supply states for the amount of power consumption.

By arranging (or sorting) the ratios in the order of time (that is, in the order in which the power consumption information is acquired from the apparatus 20), information illustrated in FIG. 18 may be obtained. FIG. 18 is a diagram illustrating an example of the change in the ratios of each of the power supply states for the amount of power consumption. FIG. 18 illustrates the change in the ratios of each of the power supply states for the amount of power consumption for N days, with respect to a certain apparatus 20, from a time 13:00 to a time 19:00.

The power save changing timing judging unit 19 may judge the recommended timing based on the change illustrated in FIG. 18, for example. More particularly, the power save changing timing judging unit 19 regards one time (or time band) of the information illustrated in FIG. 18 as the processing target (step S204). The order of the time that becomes the processing target may be from the earliest time. In the following description, the time that becomes the processing target may also be referred to as the "target time".

Next, the power save changing timing judging unit 19 judges whether the ratio of the amount of power consumption for the working state at the target time is less than or equal to a threshold value (step S205). The threshold value may be one of the setting values acquired in step S201.

When the ratio of the amount of power consumption for the working state at the target time is less than or equal to the threshold value (YES in step S205), the power save changing timing judging unit 19 judges whether the state in which the ratio of the amount of power consumption for the working state at the target time is less than or equal to the threshold value continues for a predetermined time (hereinafter also referred to as "required continuation time") or longer from the target time (step S206). The required continuation time may also be one of the setting values acquired in step S201.

When the state in which the ratio of the amount of power consumption for the working state at the target time is less than or equal to the threshold value continues for the predetermined time or longer (YES in step S206), the power save changing timing judging unit 19 judges that a time (hereinafter also referred to as "immediately preceding time") that is one acquiring interval of the target time before is the recommended timing for changing to the power saving state (step S207).

For example, when the threshold value is 40% and the required continuation time is 2 hours, the ratio of the working state in the example illustrated in FIG. 18 is 40% or less at 17:00, and does not exceed 40% for the next 2 hours. Accordingly, the time 16:00, which is the time immediately preceding 17:00, may be judged as being the recommended timing for changing to the power saving state. Of course, the time 17:00 when the ratio of the working state becomes less than or equal to the threshold value may be judged as being the recommended timing for changing to the power saving state.

In other words, after the time (16:00 or 17:00) when the above described condition is satisfied, the ratio of the amount of power consumption for the working state of the target apparatus is small, and it may be regarded that the possibility of the target apparatus being used is low. Accordingly, even when the power supply state of the target apparatus is changed to the power saving state, inconveniences to the user may be regarded to be small. The target apparatus may require slight time to resume the working state from the power saving state. Hence, inconveniences to the user when utilizing the target apparatus in the power saving state may be a waiting time required for the target apparatus to resume the working state, however, this waiting time may be slight as described above.

Next, the power save changing timing judging unit 19 regards, as a new target time, the time obtained by adding the required continuation time to the target time (step S208). This prevents the recommended timing for changing to the power saving mode from being selected again while the power supply state is undergoing the change (or transition) to the power saving state.

On the other hand, when the ratio of the amount of power consumption for the working state at the target time is greater than the threshold value (NO in step S205), or when the state in which the ratio of the amount of power consumption for the working state at the target time is less than or equal to the threshold value continues for a time shorter than the predetermined time (NO in step S206), the immediately preceding time before the target time is not judged as being the recommended timing for changing to the power saving state.

When the target time is not an end time of the log storage unit 17 (NO in step S209), the next time is set as the target time and the process returns to step S204. On the other hand, when the target time is the end time of the log storage unit 17 (YES in step S209), the process related to the target apparatus ends. Hence, when there exists an apparatus 20 for which the process is not yet performed, the process illustrated in FIG. 17 is performed by regarding this apparatus 20 as being the target apparatus.

Therefore, when the response including the judgement results of the process described above is returned to the user terminal 30, the result display unit 32 of the user terminal 30 may display a recommended timing notifying screen illustrated in FIG. 19, for example.

FIG. 19 is a diagram illustrating an example of a display of the recommended timing notifying screen. In a recommended timing notifying screen 520 illustrated in FIG. 19, the recommended timing for changing to the power saving state is 16:00 for the apparatus name "A", 17:00 for the apparatus name "B", and 11:00 and 17:00 for the apparatus name "C".

The user may refer to the recommended timing notifying screen 520 and operate the operation panel 15 of each apparatus 20 at the recommended timing of each apparatus 20, for example, in order to forcibly change the power supply state of each apparatus 20 to the power saving state. As a result, effective reduction in the amount of power consumption may be anticipated.

The setting values acquired in step S201 illustrated in FIG. 17 may be input from the user terminal 30 or the like, via a recommended timing judging parameter setting screen illustrated in FIG. 20, for example.

FIG. 20 is a diagram illustrating an example of a display of the recommended timing judging parameter setting screen. A recommended timing judging parameter setting screen 530 illustrated in FIG. 20 may include a setting region 531 to set a judging time, a setting region 531 to set the threshold value of the ratio of the amount of power consumption, a setting region 533 to set the required continuation time, and the like.

The setting region 531 may be used to set the value of N described above. The setting region 532 may be used to set the threshold value described above. The setting region 533 may be used to set the required continuation time described above.

The setting values set on the recommended timing judging parameter setting screen 530 may be received together with the monitoring request in step S110, for example, or may be received at another timing.

The power save changing timing judging unit 19 may notify the recommended timing with respect to the apparatus 20. The apparatus 20 may automatically start the change to the power saving state at the notified recommended timing.

The third embodiment may provide to the user the recommended timing to change from the working state to the power saving state having a lower power consumption than the working state. In other words, the management apparatus 10 in the third embodiment may provide, with respect to the user, a form of use of the apparatuses 20 that may reduce the amount of power consumption. The user may operate the apparatuses 20 according to the form of use provided by the management apparatus 10, in order to reduce the amount of power consumption.

The information (computed results in step S203) illustrated in FIG. 18 may be returned to the user terminal 30. The user terminal 30 may display a screen such as that illustrated in FIG. 18, in order to urge the user to judge the timing for changing to the power saving state. In this case, it is also possible to provide, with respect to the user, a form of use of the apparatuses 20 that may reduce the amount of power consumption.

In the described embodiments, the management apparatus 10 may form an example of an information processing apparatus. The power consumption information acquiring unit 13 may form an example of an acquiring unit. The power save changing timing judging unit 19 may form an example of a computation unit. The monitoring result output unit 16 may form an example of an output unit.

As described heretofore, the described embodiments may provide a form of use that may increase the possibility of reducing the amount of power consumption.

Although the embodiments are numbered with, for example, "first," "second," or "third," the ordinal numbers do not imply priorities of the embodiments. Many other variations and modifications will be apparent to those skilled in the art.

Further, the present invention is not limited to these embodiments, but various variations and modifications may be made without departing from the scope of the present invention.

What is claimed is:

1. An information processing apparatus comprising:
a storage unit configured to store a program; and
a processor configured to execute the program to perform a process including
periodically acquiring, from an apparatus via a network, first information indicating an amount of power consumption stored for each of a plurality of power supply states of the apparatus;
computing to obtain computation results including a ratio of the amount of power consumption for each of the plurality of power supply states included in the first information during an analyzing time period to a total amount of power consumption for all of the plurality of power supply states during the analyzing time period, for each first information acquired by the acquiring, and judge, based on the computation results, a timing to change from a first power supply state in which a function of the apparatus is executed to a second power supply state having a lower power consumption than the first power supply state, amongst the plurality of power supply states; and
outputting second information indicating a change in the ratio between a first ratio computed by the computing for one of the plurality of power supply states and a second ratio computed by the computing for another of the plurality of power supply states, based on an order of the first information acquired.

2. The information processing apparatus as claimed in claim 1, wherein the computing computes the ratio for each of the plurality of power supply states of a total value, by computing the total value of the amount of power consumption for each of the plurality of power supply states included in the first information, for each first information acquired in a same time band over a plurality of days.

3. The information processing apparatus as claimed in claim 1, wherein the output unit outputting further outputs a judgement result on the timing to change to the second power supply state.

4. The information processing apparatus as claimed in claim 1, wherein the computing notifies the timing that is judged to the apparatus.

5. The information processing apparatus as claimed in claim 1, wherein the computing judges the timing to change from the first power supply state to the second power supply state when the ratio of the amount of power consumption for each of the plurality of power supply states is less than a threshold value continues for a predetermined time.

6. An information processing system comprising:
an apparatus having a plurality of power supply states; and
an information processing apparatus coupled to the apparatus via a network, wherein the information processing apparatus includes a storage unit configured to store a program, and a processor configured to execute the program to perform a process including
periodically acquiring, from the apparatus via the network, first information indicating an amount of power consumption stored for each of the plurality of power supply states of the apparatus;
computing to obtain computation results including a ratio of the amount of power consumption for each of the plurality of power supply states included in the first information during an analyzing time period to a total amount of power consumption for all of the plurality of power supply states during the analyzing time period, for each first information acquired by the acquiring, and judge, based on the computation results, a timing to change from a first power supply state in which a function of the apparatus is executed to a second power supply state having a lower power consumption than the first power supply state, amongst the plurality of power supply states; and outputting second information indicating a change in the ratio between a first ratio computed by the computing for one of the plurality of power supply states and a second ratio computed by the computing for another of the plurality of power supply states, based on an order of the first information acquired.

7. The information processing system as claimed in claim 6, wherein the computing by the information processing apparatus computes the ratio for each of the plurality of power supply states of a total value, by computing the total value of the amount of power consumption for each of the plurality of power supply states included in the first information, for each first information acquired in a same time band over a plurality of days.

8. The information processing system as claimed in claim 6, wherein the outputting by the information processing apparatus further outputs a judgement result on the timing to change to the second power supply state.

9. The information processing system as claimed in claim 6, wherein the computing of the process performed by the processor of the information processing apparatus notifies the timing that is judged to the apparatus.

10. The information processing system as claimed in claim 6, wherein the computing judges the timing to change from the first power supply state to the second power supply state when the ratio of the amount of power consumption for each of the plurality of power supply states is less than a threshold value continues for a predetermined time.

11. A non-transitory computer-readable recording medium having stored therein a program for causing a computer to execute a process comprising:

periodically acquiring, from an apparatus via a network, first information indicating an amount of power consumption stored for each of a plurality of power supply states of the apparatus;

computing to obtain computation results including a ratio of the amount of power consumption for each of the plurality of power supply states included in the first information during an analyzing time period to a total amount of power consumption for all of the plurality of power supply states during the analyzing time, for each first information acquired by the periodically acquiring, and judge, based on the computation results, a timing to change from a first power supply state in which a function of the apparatus is executed to a second power supply state having a lower power consumption than the first power supply state, amongst the plurality of power supply states; and outputting second information indicating a change in the ratio between a first ratio computed by the computing for one of the plurality of power supply states and a second ratio computed by the computing for another of the plurality of power supply states, based on an order of the first information acquired.

12. The non-transitory computer-readable recording medium as claimed in claim 11, wherein the computing computes the ratio for each of the plurality of power supply states of a total value, by computing the total value of the amount of power consumption for each of the plurality of power supply states included in the first information, for each first information acquired in a same time band over a plurality of days.

13. The non-transitory computer-readable recording medium as claimed in claim 11, wherein the outputting further outputs a judgement result on the timing to change to the second power supply state.

14. The non-transitory computer-readable recording medium as claimed in claim 11, wherein the computing notifies the timing that is judged to the apparatus.

15. The non-transitory computer-readable recording medium as claimed in claim 11, wherein the computing judges the timing to change from the first power supply state to the second power supply state when the ratio of the amount of power consumption for each of the plurality of power supply states is less than a threshold value continues for a predetermined time.

* * * * *